United States Patent

Patel

[15] 3,690,121
[45] Sept. 12, 1972

[54] ABSORPTION REFRIGERATION SYSTEM

[72] Inventor: Jashwant D. Patel, 1025 James St. Apt. 32, Syracuse, N.Y. 13203

[22] Filed: Feb. 22, 1971

[21] Appl. No.: 117,577

[52] U.S. Cl. .................... 62/476, 62/497, 122/33
[51] Int. Cl. ..................... F22b 1/02, F25b 15/04
[58] Field of Search .......... 62/148, 476, 497; 122/33

[56] References Cited

UNITED STATES PATENTS

| 44,153 | 9/1864 | Bayley | 122/33 |
| 464,434 | 12/1891 | Hill | 122/33 X |
| 3,254,507 | 6/1966 | Whitlow | 62/497 X |
| 3,520,282 | 7/1970 | Fisher | 62/497 X |

Primary Examiner—William F. O'Dea
Assistant Examiner—P. D. Ferguson
Attorney—Harry G. Martin, Jr. and J. Raymond Curtin

[57] ABSTRACT

An absorption refrigeration system employing a generator having a heat pipe associated therewith to transfer heat from a suitable burner to the interior of the generator to increase the capacity of the generator without a proportionate increase in the size thereof and to minimize the inside surface temperature of the generator wall.

4 Claims, 2 Drawing Figures

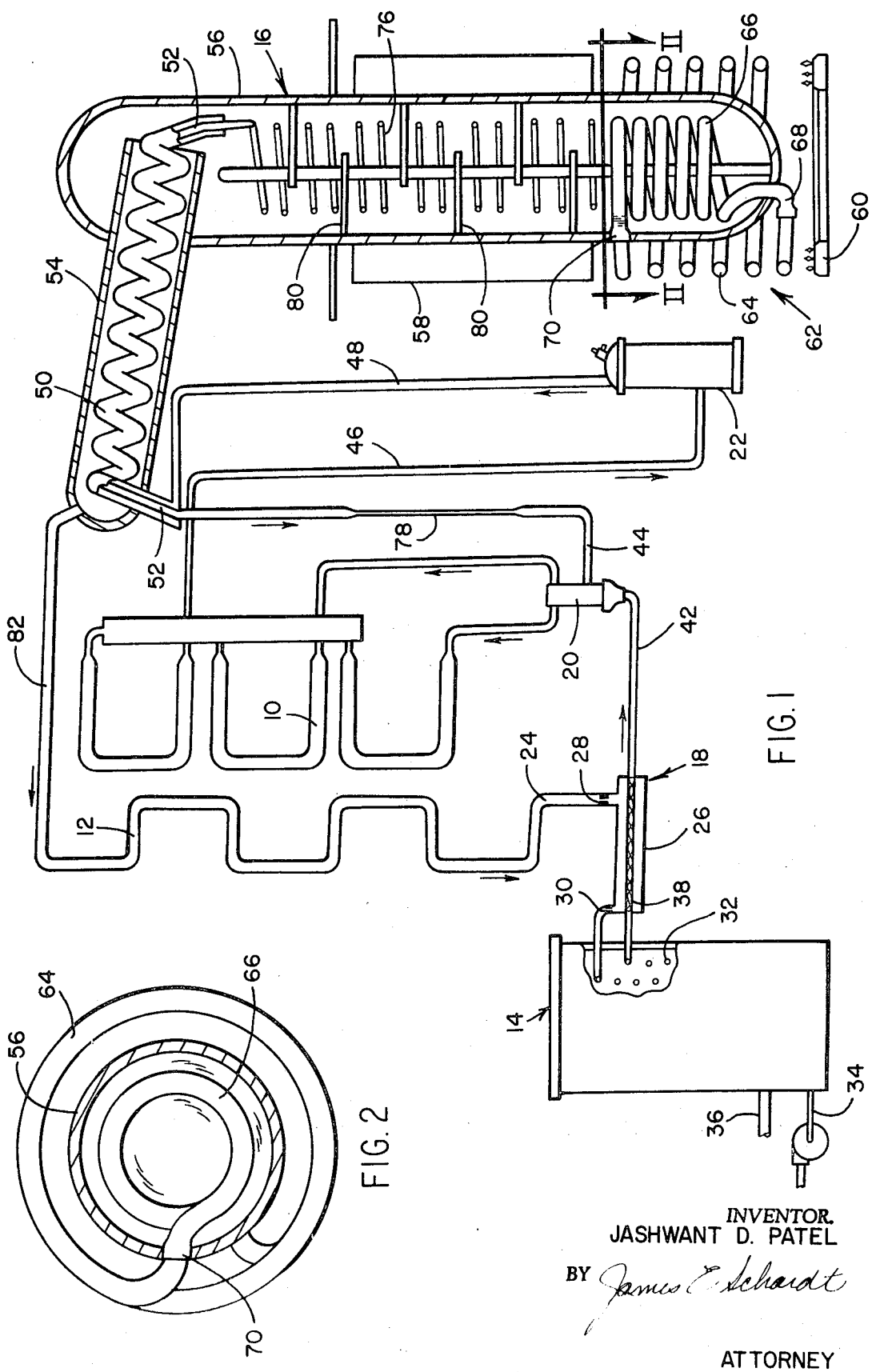

ABSORPTION REFRIGERATION SYSTEM

BACKGROUND OF THE INVENTION

In direct fired absorption refrigeration machines, it is difficult to transfer heat from the flue gas to the solution within the generator without heating the generator wall to a temperature which permits corrosion of the generator and deterioration of the solution therein. For optimum machine efficiency the greatest quantity of heat possible should be transferred from the flue gas to the solution.

One method for accomplishing this purpose is to provide fins on the generator to transfer the heat to the generator wall and subsequently to the solution therein. However, the combustion temperature adjacent the burner is often high enough to oxidize the fins or to produce an excessive generator wall temperature which could accelerate corrosion of the generator and cause premature failure thereof.

Another method for transferring a large quantity of heat to the solution within the generator is to employ a heat pipe, a portion of which is exposed to the burner and a portion of which is exposed to the solution within the generator. The heat pipe is charged with a suitable heat exchange fluid such as water. The heat transfer fluid within the heat pipe is vaporized by the heat from the burner. The heat of vaporization is transferred to the solution within the generator, thereby condensing the heat transfer fluid. The condensed heat transfer fluid passes into the portion of the heat pipe adjacent the burner where it is again vaporized for passage into the interior of the generator.

SUMMARY OF THE INVENTION

This invention relates to an aqua-ammonia absorption refrigeration system having a generator, an absorber, a condenser and an evaporator connected to provide refrigeration. Burner means are provided adjacent the generator for heating the solution therein. A heat pipe having heat exchange medium therein is associated with the generator, the heat pipe comprising an interior coil within the generator in contact with the solution therein and an exterior coil encircling the generator in the discharge path of the flue gas from the burner, the lowest turn of the coil within the generator being offset in an upward direction from the lowest turn of the coil exterior of the generator for increased circulation within the heat pipe, the interior and exterior coils extending helically in the same circular direction to provide a smooth transition at the top of the coils for the flow of heat exchange medium from the exterior coil to the interior coil.

BRIEF DESCRIPTION OF THE DRAWINGS

FIG. 1 is a schematic diagram of an absorption refrigeration system employing a generator having a heat pipe associated therewith.

FIG. 2 is a sectional view of the generator illustrated in FIG. 1 taken along line II—II of FIG. 1.

DESCRIPTION OF THE PREFERRED EMBODIMENT

Referring to the drawings there is illustrated an absorption refrigeration system comprising an absorber 10, a condenser 12, an evaporator or chiller 14, a generator 16, a liquid-suction heat exchanger 18, and a vapor distributor 20 connected to provide refrigeration. A pump 22 is employed to circulate weak absorbent solution from absorber 10 to generator 16.

As used herein, the term "weak absorbent solution" refers to solution which is weak in absorbent power, and the term "strong absorbent solution" refers to a solution which is strong in absorbent power. A suitable absorbent for use in the system described is water; a suitable refrigerant is ammonia.

Liquid refrigerant condensed in condenser 12 passes through refrigerant liquid passage 24 to the liquid-suction heat exchanger. The liquid-suction heat exchanger 18 includes a housing 26 having a refrigerant restrictor 28 at the upstream end and a refrigerant restrictor 30 at the downstream end thereof. A portion of the liquid refrigerant supplied to the liquid-suction heat exchanger 18 flashes upon passing through restrictor 28 due to the low pressure existing downstream of the restrictor, thereby cooling the remainder of the refrigerant in the housing 26. The cooled refrigerant liquid and flashed refrigerant vapor then pass through restrictor 30 into heat exchanger 32 of chiller 14.

A heat exchange medium such as water is passed over the exterior of heat exchanger 32 where it is chilled by giving up heat to evaporate the refrigerant within the heat exchanger. The chilled heat exchange medium passes out of chiller 14 through line 34 to suitable remote heat exchangers (not shown) after which it is returned to the chiller through inlet 36 for rechilling.

The cold refrigerant evaporated in heat exchanger 32, along with a small quantity of absorbent which is carried over to the chiller with the refrigerant from the generator, passes into refrigerant vapor passage 38 of liquid-suction heat exchanger 18. The refrigerant vapor and absorbent liquid, which has a large quantity of refrigerant absorbed therein, passes through refrigerant vapor passage 38 in heat exchange relation with the refrigerant passing through housing 26. Refrigerant vapor and absorbent solution from passage 38 passes to refrigerant distributor 20 through line 42. The refrigerant vapor and absorbent solution from line 42 are mixed in the distributor 20 with solution from the generator 16 which is supplied to the distributor through line 44.

The absorbent solution-refrigerant vapor mixture from distributor 20 is supplied to absorber 10 where a cooling medium, preferably ambient air, is passed over the surface of the absorber in heat exchange relation with the solution therein for cooling the absorbent solution to promote the absorption of the refrigerant vapor by the solution. The same cooling medium may be supplied to condenser 12 in heat exchange relation with refrigerant vapor therein to condense the refrigerant.

Cold weak absorbent solution passes from absorber 10 through line 46 into the pump 22. Liquid from pump 22 is passed through line 48 to rectifier heat exchange coil 50. The weak solution passes through coil 50 in heat exchange relation with hot strong solution passing through heat exchange coil 52 disposed within coil 50 and with the hot refrigerant vapor flowing through rectifier shell 54 in contact with the outer surface of coil 50. The weak solution from coil 50 is discharged into the upper portion of generator 16 along with any vapor which is formed in coil 50 due to heat exchange with the hot vapor passing thereover and the hot solution flowing therethrough.

Generator 16 comprises a shell 56 having fins 58 suitably affixed thereto as by welding. The generator is heated by a gas burner 60 or other suitable heating means. A heat exchanger or heat pipe 62 comprising a coil 64 external of the generator and a coil 66 on the interior of the generator is provided to transfer heat from the burner 60 to the solution within generator 16. The heat pipe 62 is formed of a suitable material such as stainless steel which is resistant to corrosion at the high temperature produced by the burner 60. The heat pipe is partially filled with a suitable heat exchange medium such as distilled water. In areas where the machine might be exposed to freezing temperatures, a suitable anti-freeze solution such as a 12 percent aqueous lithium bromide solution could be used in place of distilled water. The heat from burner 60 vaporizes the heat exchange medium in coil 64. The vapor from coil 64 passes through fitting 70 into coil 66 within the generator where it is condensed by giving up heat to the solution in the generator. The condensed heat exchange medium from coil 66 passes through drain line 68 to coil 64 where it is again vaporized for subsequent passage through fitting 70 into coil 66.

The heat pipe configuration and the quantity of liquid heat exchange medium therein is critical to the proper operation of the heat pipe. For safe operation, the pressure developed within the sealed heat pipe must be carefully controlled. An insufficient quantity of heat exchange medium will allow the vapor generated therein to be superheated, thereby causing a rapid rise in pressure beyond safe operating limits. An excessive charge of heat exchange medium will also result in internal pressures beyond the desired maximum pressure. For optimum performance of the heat pipe, the vapor fraction of the heat exchange medium at fitting 70 should be 100 percent. For a given heat pipe tube length, the rate of heat exchange medium circulation within the pipe is dependent upon tube diameter, the degree of upward displacement of the interior coil in relation to the exterior coil of the heat pipe and the restriction to flow caused by the innerconnection between the exterior and interior coils at the upper portion thereof. To reduce the flow restriction at the top portion of the heat pipe, the interior and exterior coils extend helically in the same circular direction, thereby providing a smooth transition from the exterior coil to the interior coil at the top of the heat pipe. The degree of offset between the interior and exterior coils is limited by the internal construction of the generator and the maximum desired installed height of the generator within the machine housing. By arranging the lowest turn of the interior coil approximately one inch above the lowest turn of the exterior coil, the desired circulation rate of heat exchange medium from the interior coil to the exterior coil is obtained.

The diameter of the heat pipe tubing also effects circulation of heat exchange medium within the coil. By constructing the heat pipe of ⅝-inch-diameter tubing, the desired circulation of heat exchange medium may be obtained. While it is possible to construct the heat pipe out of smaller or larger tubing, smaller tubing may restrict the circulation of heat exchange medium within the heat pipe, creating the possibility of excessive pressures being generated therein. Tubing larger than five-eighth inch, while it does not restrict the flow of heat exchange medium, is undesirable since the sharp bends necessary in the restricted space above the burner and within the generator are difficult and uneconomical to manufacture.

As stated heretofore, the charge of heat exchange medium within the heat pipe is critical. In a heat pipe constructed in accordance with the foregoing parameters, a minimum charge of approximately 35 percent should be utilized to obviate the possibility of vapor superheat and the excessive pressures caused thereby. A volume of liquid heat exchange medium exceeding 65 percent of the total interior volume of the heat pipe may also cause excessive pressures to be generated within the heat pipe. The volume of liquid heat exchange medium charged into the heat pipe should therefore be within the range of 35 percent to 65 percent of the interior volume of the heat pipe.

Since the heat pipe is utilized to increase the amount of heat which may be transferred from a burner to the solution within an absorption refrigeration system generator while maintaining the temperature of the generator walls below the temperature level at which accelerated corrosion occurs, it is also necessary to maintain the exterior surface of the interior coil of the heat pipe below the temperature level at which accelerated corrosion results. To obtain this wall temperature, the heat transfer surface of the heat pipe in contact with the solution should be approximately one-half the surface area of the heat pipe in contact with the flue gases from the burner.

Thus by providing a heat pipe having a ⅝-inch-tube diameter, a heat transfer surface within the generator approximately one-half the exterior heat transfer surface, an offset of approximately one inch between the bottom of the interior coil and the bottom of the exterior coil, an interior coil wound in the same direction as the exterior coil and a charge of heat transfer medium within the range of 35 percent to 65 percent of the total volume of the interior of the heat pipe, maximum transmission of heat from the burner to the solution may be obtained while maintaining internal pressures within the heat pipe within a safe range and maintaining the exterior wall temperature of the interior coil of the heat pipe below the temperature at which accelerated corrosion by the absorbent solution is encountered.

By locating the outer coil of the heat pipe in close proximity to the lower surface of the generator vessel, the heat from the burner is transferred both to the generator wall and to the solution within the heat pipe. Thus, the flue gas from the burner contacts a large heat exchange surface which in effect lowers the temperature of the heat exchange surface while transferring more heat thereto. The same conditions prevail on the interior of the generator. Since heat is transferred to the solution through the generator wall and through the walls of the heat pipe coil, a greater quantity of liquid is exposed to the increased heat transfer surface, allowing a greater quantity of heat to be transferred to the solution.

The temperature of the solution within the generator is ordinarily a function of the boiling point of the solution at the pressures existing within the machine. However, since a large quantity of heat must be transferred to the solution, the solution nearest the heat transfer surface may be heated to a temperature substantially above the boiling point. By increasing the heat exchange surface area within the generator, a greater quantity of heat may be transferred to the solution while maintaining the solution adjacent the heat exchange surface at a temperature nearer the boiling point of the solution than has heretofore been possible. Therefore, by utilizing the heat pipe, the generator wall temperature and the temperature of the solution within the generator is reduced, while at the same time the flue gas temperature discharged from the generator is also reduced. Thus, a greater quantity of heat is supplied to the solution than has been possible heretofore even though the maximum temperature of the solution and the generator wall is materially reduced.

The weak solution which is boiled in generator 16 concentrates the solution, thereby forming a strong solution and refrigerant vapor.

The hot strong absorbent solution passes upwardly through the analyzer section of generator 16, through analyzer coil 76 in heat exchange with the weak solution passing downwardly over the coil. The warm strong solution then passes through heat exchange coil 52 within coil 50 and line 44 into the distributor 20. A restrictor 78 is provided in line 44 so that the solution supplied to the vapor distributor 20 is at the same pressure as the vapor in line 42.

Refrigerant vapor formed in generator 16 passes upwardly through the analyzer section thereof where it is concentrated by mass heat transfer with weak solution passing downwardly over analyzer coil 76. Analyzer plates 80 in generator 16 provide a tortuous path for flow of solution and vapor to assure intimate contact therebetween to improve the mass heat transfer. The vapor then passes through rectifier 54 in heat exchange relation with the weak solution passing through coil 50. Absorbent condensed in rectifier 54 flows downwardly into the generator along with the weak solution discharged from coil 50. Refrigerant vapor passes from rectifier 54 through line 82 to condenser 12 to complete the refrigeration cycle.

While I have described a preferred embodiment of my invention, it is to be understood that the invention is not limited thereto since it may be otherwise embodied within the scope of the following claims.

I claim:

1. An aqua-ammonia absorption refrigeration system comprising a generator, an absorber, a condenser and an evaporator connected to provide refrigeration;
   burner means disposed adjacent said generator for heating the solution therein;
   a heat pipe associated with said generator having a heat exchange medium therein, said heat pipe having a heat exchange coil interior of the generator in contact with the solution therein and a heat exchange coil exterior of and encircling the generator in the discharge path of the flue gas from said burner means, the lowest turn of said coil within said generator being offset in an upward direction from the lowest turn of said exterior coil for increased circulation within said heat pipe, said interior and exterior coils extending helically in the same circular direction to provide a smooth transition at the top of said coils for the flow of heat exchange medium from the exterior coil to the interior coil, the offset between the coil within said generator and the coil exterior of said generator and the smooth transition between the exterior and interior coil providing a minimal restriction to the flow of heat exchange medium to increase heat transfer efficiency and to reduce pressure within the coil.

2. An absorption refrigeration system according to claim 1 wherein the heat exchange surface area of said exterior coil is substantially double the surface area of said interior coil.

3. An absorption refrigeration system according to claim 2 wherein said heat exchange pipe coils are formed of approximately five-eighth inch outside diameter steel tubing, the lowest turn of said interior coil being disposed approximately one inch above the lowest turn of said exterior coil.

4. An absorption refrigeration system according to claim 3 wherein said heat pipe is charged with a volume of liquid heat exchange medium equal to at least 35 percent and not exceeding 65 percent of the interior volume of said heat pipe.

* * * * *